US011328723B2

(12) United States Patent
King et al.

(10) Patent No.: US 11,328,723 B2
(45) Date of Patent: May 10, 2022

(54) TALK GROUP MANAGEMENT USING VOICE CONTROL

(71) Applicant: MOTOROLA SOLUTIONS, INC., Chicago, IL (US)

(72) Inventors: Melanie King, Hollywood, FL (US); Jari Pretam B. Pagar Jarvinen, Coral Springs, FL (US); Craig Siddoway, Davie, FL (US); Erin B Bryant, Plantation, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 235 days.

(21) Appl. No.: 16/834,713

(22) Filed: Mar. 30, 2020

(65) Prior Publication Data

US 2021/0304746 A1 Sep. 30, 2021

(51) Int. Cl.
*G10L 15/22* (2006.01)
*G10L 15/26* (2006.01)
*G06F 3/16* (2006.01)
*G10L 15/30* (2013.01)

(52) U.S. Cl.
CPC ............ *G10L 15/22* (2013.01); *G06F 3/167* (2013.01); *G10L 15/26* (2013.01); *G10L 15/30* (2013.01); *G10L 2015/223* (2013.01); *G10L 2015/228* (2013.01)

(58) Field of Classification Search
CPC ......... G10L 15/22; G10L 15/26; G10L 15/30; G10L 2015/223; G10L 2015/228; G06F 3/167

See application file for complete search history.

(56) References Cited

U.S. PATENT DOCUMENTS

| 7,393,151 B1 | 7/2008 | Miller, Jr. |
| 9,961,516 B1 | 5/2018 | Proctor |
| 10,102,403 B1* | 10/2018 | Akens ............... G07C 9/00706 |
| 10,372,755 B2 | 8/2019 | Blanco |
| 2004/0220723 A1 | 11/2004 | Gould Bear et al. |
| 2005/0073436 A1 | 4/2005 | Negreiro |

(Continued)

FOREIGN PATENT DOCUMENTS

| IN | 209595 | 9/2007 | |
| WO | WO-2016204483 A1 * | 12/2016 | ............. H04W 4/90 |

OTHER PUBLICATIONS

WO 2016204483 A1—Translation (Year: 2016).*

*Primary Examiner* — Huyen X Vo
*Assistant Examiner* — Athar N Pasha
(74) *Attorney, Agent, or Firm* — Barbara R. Doutre

(57) ABSTRACT

A portable radio (100) provides a voice control feature which advantageously enables radio users to perform talk group changes by using voice as an input medium to the radio device. Activation of a voice control button (110) and verbal entry of a valid talk group control command enables a change in talk group. The portable radio (100) comprises a controller (102) having a code plug (120) pre-programmed with a plurality of talk group alias names, and an automatic speech recognition (ASR) engine (118) providing voice control entry detection to the portable radio. The controller (102) enables a change in talk group in response to the ASR engine (118) detecting that the voice control entry is a valid talk group control command. Shortened audible confirmations of talk group change are generated using the alias names.

20 Claims, 2 Drawing Sheets

(56) References Cited

U.S. PATENT DOCUMENTS

| | | | |
|---|---|---|---|
| 2009/0125259 A1* | 5/2009 | Nicholls | G01R 23/16 |
| | | | 702/76 |
| 2014/0195252 A1 | 7/2014 | Gruber et al. | |
| 2015/0023227 A1* | 1/2015 | Khoo | H04B 7/2656 |
| | | | 370/280 |
| 2016/0165424 A1* | 6/2016 | El-Dinary | H04H 20/59 |
| | | | 455/404.2 |
| 2016/0241494 A1* | 8/2016 | Badge | H04L 51/046 |
| 2018/0167694 A1* | 6/2018 | Kim | H04N 21/4345 |
| 2018/0181656 A1 | 6/2018 | Proctor | |
| 2019/0259382 A1 | 8/2019 | Stogner et al. | |
| 2019/0320071 A1* | 10/2019 | Mastro | H04M 9/085 |
| 2020/0154512 A1* | 5/2020 | Hao | H04W 76/45 |
| 2020/0258606 A1* | 8/2020 | Ferentz | G06F 16/245 |
| 2021/0248137 A1* | 8/2021 | Luo | G06F 16/285 |
| 2022/0059089 A1* | 2/2022 | Choi | H03G 3/20 |

* cited by examiner

TALK GROUP MANAGEMENT USING VOICE CONTROL

FIELD OF THE INVENTION

The present invention relates generally to communication devices, and more particularly public safety talk group control using voice.

BACKGROUND

Communication devices, particularly those used in potentially hazardous environments such as law enforcement, fire rescue, heavy industrial, and other mission-critical environments, rely on proper portable radio operations. Talk group control is considered a mission critical function of public safety radio operation. A talk group provides a way of organizing radio traffic based on zones and channels operating within those zones. Changing talk groups has typically involved the use of multiple actions such as manipulating a switch and/or scrolling through a display on the radio. The time involved in changing talk groups may result in partial or missed communications as well as diverting a user's attention away from other tasks. Hence, there is a desire to improve the talk group control function so as to minimize delays and simplify the user experience.

Accordingly, there is a need for an improved user interface for controlling talk groups in a portable communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
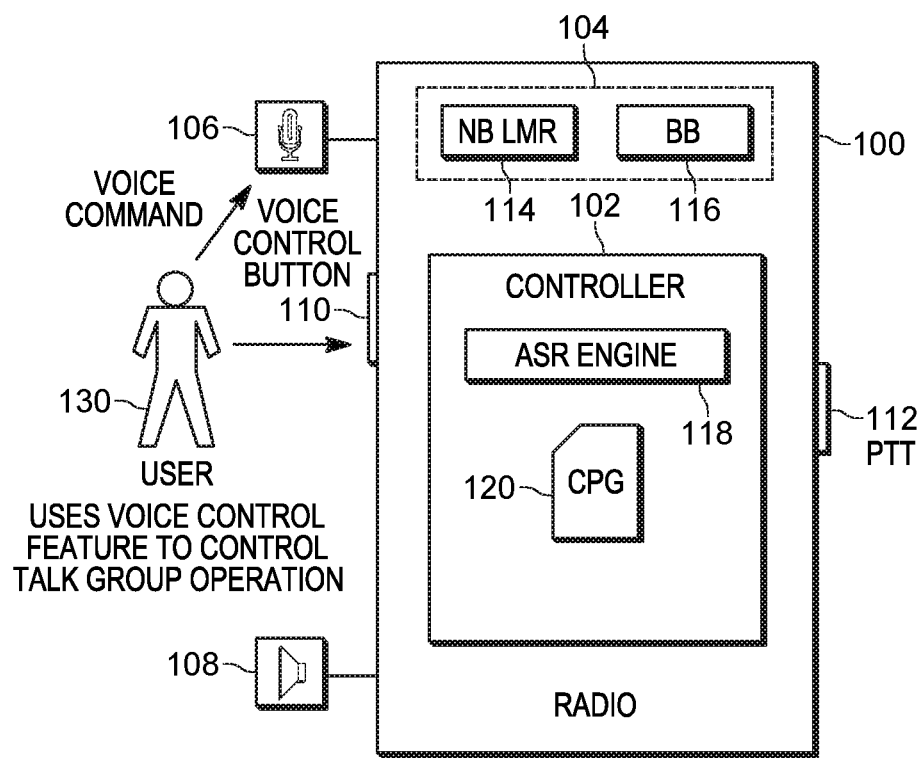
FIG. 1 is a block diagram of a portable communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a voice control feature for managing talk groups for a radio communication device. The voice control feature provides a user interface which is responsive to a voice command entry that enables changes in radio traffic talk groups, those changes being based on zones and/or channels operating within those zones.

Using voice commands as an input medium to the radio device to control radio talk group changes facilitates and speeds up the changing of talk groups during public safety communications, such as Land Mobile Radio (LMR) communications. While some speech recognition options are available on certain types of consumer LTE/broadband devices, such as cellular phones, tablets, and laptops, such voice recognition is not readily available to LMR radio applications due to the limited data rate speeds, narrow bandwidth, and environmental conditions, such as loud noise environments, within which LMR radios operate. For communication devices that provide both LMR narrowband communications and broadband communications, the need to prioritize mission critical LMR functionality, such as talk group control, is of the utmost importance. Talk group management using voice control addresses the above referenced challenges.

FIG. 1 is a block diagram of a communication device 100 formed and operating in accordance with some embodiments. Communication device 100 comprises a battery powered portable public safety communication device, which will also be referred to as a portable radio 100. The portable radio 100 comprises a controller 102 having one or more processors interoperating with a transceiver 104. The portable radio comprises a plurality of user interfaces, such as a microphone 106, a speaker 108, a voice control button 110, and a push-to-talk (PTT) button 112. The transceiver 104 provides converged functionality through a plurality of different sub-transceivers allowing for narrowband operation and broadband operation of the radio. For example, transceiver 104 may comprise a land mobile radio (LMR) transceiver 114 for narrowband (NB) operations, such as two-way radio (half-duplex) communications, as well as a broadband (BB) transceiver 116 for high speed communications. Examples of the broadband transceiver high speed communications may include Wi-Fi, LTE 4G, LTE 5G, or some other high-speed wireless broadband communication. The controller 102 comprises an automatic speech recognition (ASR) engine 118 and at least one code plug (CPG) 120.

In accordance with the embodiments, the portable radio 100 provides a voice control feature which advantageously enables radio users to perform talk group changes by using voice as an input medium to the radio device during LMR operation. In accordance with the embodiments, activation of the voice control button 110, in a manner to be described herein, and verbal entry of a valid talk group control command enables a change in talk group.

Upon activation of the voice control button 110, a single voice control entry can be advantageously input to the radio by speaking a command word (channel and/or zone) followed by a target, wherein the target has been configured as an alias channel name and/or alias zone name The command word remains fixed (stored in the radio software) and comprises the command words "channel" and/or "zone". In accordance with the embodiments, the alias name is configurable and preprogrammed into code plug 120. In accordance with the embodiments, the code plug 120 is pre-programmed with a plurality of channel alias names and zone alias names. Configuration of the radio code plug 120 may be accomplished via computer programming software (CPS) over an agency network. Agency configurable names are programmed into a programming field reserved for the voice control alias names, also referred to as friendly names. These alias names are selected based on words that the user is, or can easily become, familiar with. For example, 'Channel 1' may be configured in the code plug 120 as "Tactical" and 'Zone A' may be configured as "North East". Hence, a voice control entry of "Channel Tactical, Zone North East" will be processed as a command and will switch the radio talk group over to Channel 1, Zone A.

In accordance with the embodiments, the ASR engine 118 provides voice control entry detection to the portable radio, and the controller 102 enables a change in talk group in response to the ASR detecting that a voice control entry is a talk group control command. The use of voice control entry including a command followed by a zone alias name and/or channel alias name simplifies the user interface for talk group change.

During regular LMR operation, transmission of voice is controlled by having a user 130 press the push-to-talk (PTT) button 112 and speak into the microphone 106 of the portable radio 100. The audio signals are converted to radio frequency signals which are transmitted to another remote receiving radio. PTT operation allows for a half-duplex mode of operation in which one person (e.g. user 130) speaks and a remote radio user listens. The PTT button remains pressed while the user speaks into the radio, and only one party can talk at a time. Due to the criticality of PTT communication, it is important that the PTT button 112 remain dedicated to the half-duplex voice communication. The voice talk group command is spoken into the radio without pressing the PTT button 112. The additional voice control button 110 of the embodiments advantageously enables a voice control feature that manages talk group change during LMR operation.

In accordance with the embodiments, portable radio 100 provides the voice control feature, in which the voice control entry is made during a press and hold of the voice control button 110. The user presses and holds the button 110, waits for a tone, (for example, 10 milliseconds), speaks a talk group command into microphone 106 and then releases the button. Upon release of the voice control button 110, the talk group command is processed, and audible feedback is generated by the radio in the form of a channel confirmation and zone announcement, as applicable.

In addition to controlling radio talk group change, the voice control button 110 may also be used to enable other voice control features, such as volume control, radio profile changes, turning radio scan on and off, and querying battery level, time, volume level, current zone and channel to name a few. Each of these features have command variations associated with their respective intended function.

The talk group command is processed locally at the radio 100 by the ASR engine 118 and controller 102 based on the user-configured talk group commands stored in code plug 120. All commands and control of talk group changes occur locally at the radio without the use of remote storage. The radio will effect talk group change by directly switching to the channel and/or zone entered based on the voice command entry.

Confirmation of the talk group change is provided back to the user via an audible confirmation generated at speaker 108. Audible notifications are also generated via speaker 108 to indicate a failure in talk group change. Hence, in response to the voice command entry, the portable radio 100 generates an audible feedback response comprising one of: audible confirmation of talk group change being taken, or audible notification that talk group change was not taken.

In accordance with some embodiments, the audible confirmation may be configured to: audibly repeat the preconfigured channel alias name in response to changing to that channel within a current zone, without announcing the zone; audibly repeat the preconfigured channel alias name and announce the preconfigured zone alias name, when the channel is in a different zone; generate an audible notification of channel unavailability when the preconfigured channel alias name entered via the voice command is unavailable; generate an audible notification of channel unavailability when the preconfigured channel alias name entered via the voice command has not been configured within the radio; and audibly repeat both the preconfigured zone alias name and the preconfigured channel alias name in response to the voice command entry comprising both the preconfigured zone alias name and preconfigured channel alias name, wherein both the zone and channel associated therewith are available.

In accordance with some embodiments, the audible confirmation comprises a truncated portion of the talk group control command. Hence, the audible confirmation of talk group change repeats only the alias name and does not repeat the words "channel" or "zone", which further advantageously expedites the switch to the new talk group.

There may be occasions where incoming LMR signals come into the radio while the user is in the process of changing talk groups. These situations can be handled via configurations within the code plug 120. For example, the receipt of incoming LMR signals (from a remote source) during the pressing of the voice control button 110 can be handled in one of two ways via code plug configuration. The code plug 120 may be configured to perform one of: blocking the use of the voice control function or muting received LMR audio signals during a voice control button press. For example, some agencies may wish to prevent the user from interrupting incoming LMR audio, by blocking the voice control feature, thereby ensuring that LMR mission critical communications are maintained.

In accordance with some embodiments, receive signals, which may be received by the radio subsequent to the talk group change, but prior to the audible confirmation, may be mixed with the audible confirmation played out at speaker 108. Hence, regular receive LMR communications may be mixed during the generation of confirmation alert output from speaker 108, thereby ensuring that mission critical communications are maintained during the talk group change process.

Again, the alias names used for voice commands are advantageously user-configurable. The user may select the alias name for each channel and zone. For example, 'Channel 1' may be configured as "Tactical" and 'Zone A' may be configured as "North East". Different agency names may also be used as combined channel and zone commands, such that the user need only speak the command and a single word channel during the press and hold of the voice control button 110. For example, "SWAT", "FIRE", and "SHERIFF" or other public safety names can be programmed into the code plug 120 for recognition by the ASR 118 as a particular channel. Hence, voice command entries of "channel SWAT", "channel FIRE", and channel SHERIFF" will switch the radio talk group to that channel. In accordance with the various embodiments, and as mentioned previously, the audible confirmation comprises a truncated portion of the voice command. Hence, the audible confirmation of talk group change does not repeat the words "channel" or "zone", which further advantageously expedites the return to LMR communications within the new talk group. If radio signals are received during the audible confirmation of talk group change, such received signals can be mixed with the audible confirmation being played out at the speaker.

A few examples are provided to further illustrate the voice control feature for controlling talk group management in accordance with some embodiments.

Channel Change (Maintain Current Zone): If the user 130 wishes to change to a different channel within the same zone, the user presses and holds the voice control button 110, waits for generation of a tone, (for example, 10 milliseconds), and then speaks the command into the microphone 106 and then releases the button. The portable radio 100 will switch to that channel within that zone and repeat to the user the name of the channel, via speaker 108. For example, if the user 130 says "Channel Tactical" then the radio 100 will respond with an audible notification of "Tactical", at speaker 130, after changing to that channel, while staying within the same zone. The 'zone' need not be stated. The word 'channel' will not be repeated, only the channel alias name is repeated as the confirmation.

Channel Change (Different Zone): If the user 130 requests a different channel, and that channel is on a different zone, then the radio controller 102 will look for the requested channel alias name on another zone, within the code plug 120. The first zone that the controller finds with that channel alias name will cause a switch to that new zone. In this case, the radio feedback generated at speaker 108 will include the name of the zone and the channel to let the user know that the zone has changed. For example, user 130 says "Channel Tactical" and radio responds with an audible alert "North East Tactical" after changing to the Tactical channel within the North East zone, where the channel has been located.

Channel Change (Not On Any Zone): If the channel entered via the voice control feature is not on any of the zones associated with the radio, then the radio will respond with an audible notification of "Channel Not Available" or a tone (e.g. double bonk) at speaker 108.

Zone and Channel specified: If the user 130 requests a specific zone and specific channel, then the radio controller 102 will search within the code plug 120 for the requested zone and channel directly. For example, user 130 says "Zone North East Channel Tactical" and radio 100 responds with an audible notification of "North East Tactical" after changing to the North East zone and Tactical channel.

All of these examples show how the voice control feature advantageously allows a user to change zone and channel with a single action—that being voice control entry. In other words, the radio will directly switch to a channel and/or zone in response to a single talk group control command to effect talk group change by speaking a channel alias name and/or zone alias name. The user no longer needs to rotate a knob or scroll through a display to a zone, such as Zone A, and then scroll or rotate to a channel, such as Channel 3, thereby saving considerable time. The voice control talk group feature is an input-only verbal command function which requires no queries between the radio and the user.

One or more code plugs may be updated over time as different talk groups are added or changed within a portable radio. The code plugs may be updated for different users and the particular usage applications each user has for the radio. The zone and channel alias/friendly names can be changed by a radio administrator using computer programming software.

Figure 2:
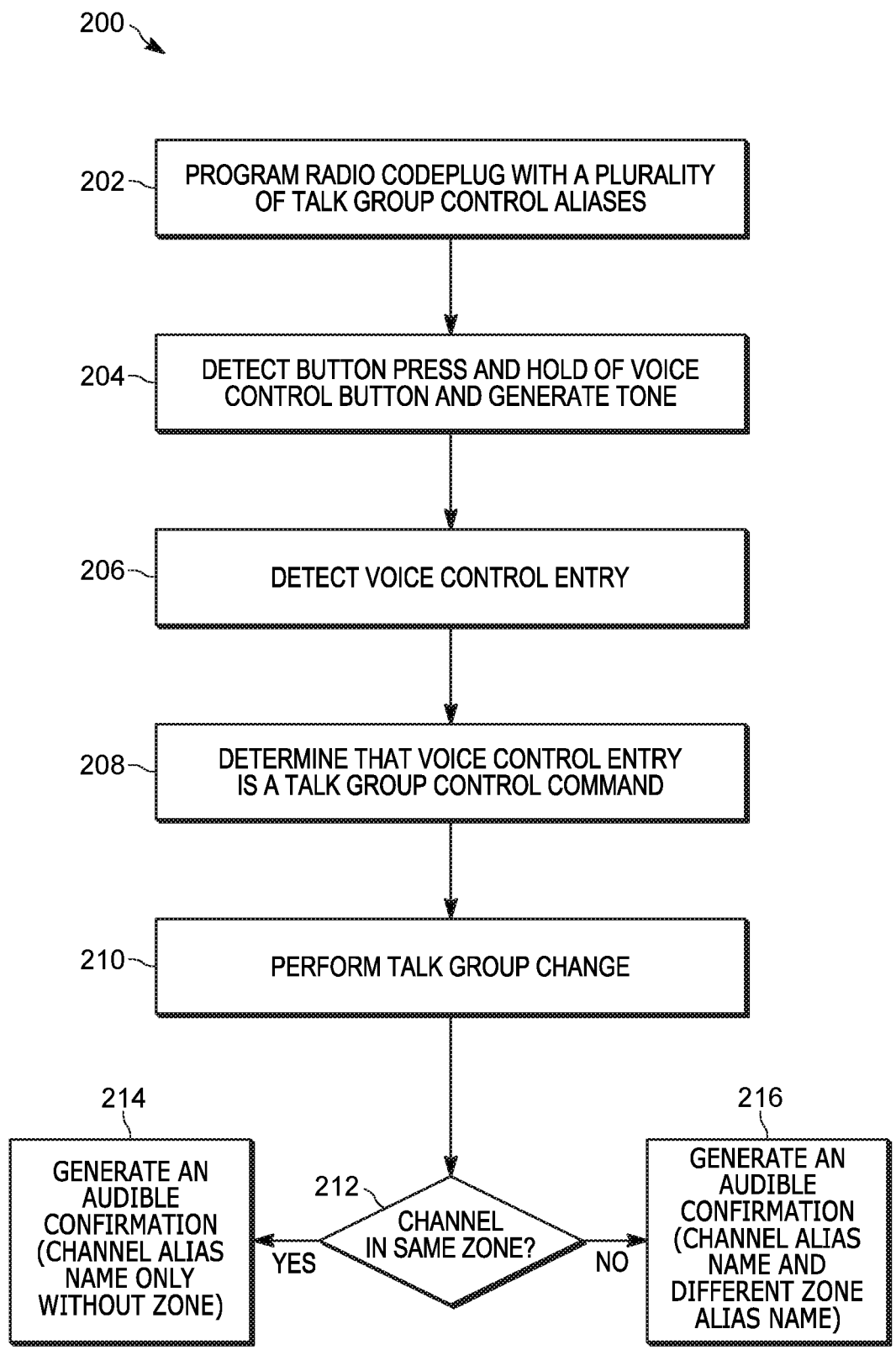
FIG. 2 is a method of managing talk groups using voice control in accordance with some embodiments.

FIG. 2 is a method 200 of managing talk groups using voice control in accordance with some embodiments. Method 200 begins at 202 by preprogramming a radio code plug with a plurality of talk group control aliases including channel alias names and zone alias names. The radio code plug is programmable and configurable, such as by an agency. The agency configured talk group control aliases are programmed into the code plug using alias names which are familiar to the radio user. The talk group aliases provide targets for channel and zone commands. As mentioned previously, talk groups organize radio traffic based on a plurality of zones and a plurality of channels operating within each of the plurality of zones. In accordance with the embodiments, each zone is preconfigured with a zone alias name and each channel is pre-programmed with a channel alias name.

The method continues at 204, with a radio now deployed in the field, detecting, at the radio controller, a press and hold of the voice control button 110, followed by tone generation. A voice control entry is detected at 206, by the automatic speech recognition (ASR) engine 118 of FIG. 1. The method continues at 208 with determining, by the ASR engine 118, that the voice control entry is a talk group control command comprising a command word (channel and/or zone) followed by an alias name (alias channel name and/or zone alias name). The method continues with performing a talk group change at 210 in response to the talk group control command, followed by generating an audible confirmation, at speaker 108 of FIG. 1. The audible confirmation is configured based on determining whether the channel is in the current zone or a different zone at 212.

Voice control entry of a talk group command may be accomplished, for example, by a user speaking a channel command with channel alias name, without stating a zone. The ASR recognizes the speech and the controller performs the search of the zone for the commanded channel alias name, without requiring the user to say the name of the zone. If the channel command results in a talk group change on the current zone, the portable radio will remain on the current zone and audibly repeat only the preconfigured channel alias name, without announcing the zone alias name at 214. If the channel command results in a talk group change to a different zone than the current zone, then the portable radio will switch to the different zone and audibly repeat the preconfigured channel alias name and announce the different zone alias name at 216. Not requiring the user to enter the zone alias name advantageously speeds up the voice command entry process. Audible confirmation announced at the speaker can include both the channel alias name and the different zone alias name, thereby alerting the user to the change in zone. Automated audible feedback can also be generated indicating that the talk group is unavailable. For example, a double "bonk, bonk" tone may be generated.

A variety of scenarios provide for different audible confirmations. Each scenario results in a fast, effective, alert to the user without taking up excessive time. In accordance with various embodiments, the generation of the audible confirmation at 212 may comprise:

audibly repeating the channel alias name in response to changing to that channel within a current zone, without announcing the current zone;

audibly repeating the channel alias name and announcing the zone alias name, when the channel command is in a different zone;

generating an audible notification of channel unavailability when the channel alias name entered via the command is unavailable;

generating an audible notification of channel unavailability when the channel alias name entered via the command has not been configured within the portable radio; and audibly repeating both the zone alias name and the channel alias name in response to the voice command entry comprising both the zone alias name and channel alias name, wherein both the zone and channel associated therewith are available.

In accordance with some embodiments, the method may further comprise receiving LMR receive signals, subsequent to the talk group change but prior to the confirmation being played out. Such receive signals may be mixed with the audible confirmation played out at speaker 108. Hence, regular receive LMR communications may be mixed during the generation of confirmation alert output from speaker 108.

Method 200 advantageously allows the portable radio to be responsive to a single action, that being a voice command entry to effect talk group change, without query from the portable radio. Truncated confirmation of talk group change further expiates the return to LMR communications within the new talk group.

The portable radio and method advantageously simplify the control of talk group changes via a single button press and self-configured audio command. Hence, scrolling through displays and switching through control knob selections has been eliminated. The user's attention can now advantageously remain focused and need not be diverted to radio menus. The confirmation alerts are kept to short or truncated versions of the talk group control command which further expedites resuming LMR communications.

Accordingly, there has been provided an apparatus and method that provide a voice control feature that simplifies the control of talk group selection in portable communication devices, particularly those devices operating as public safety radios in the land mobile radio (LMR) domain. Portable communication devices that provide combined narrowband LMR and broadband communications can take advantage of the voice controlled talk group management which maintains mission critical operation. The challenges of narrowband operations associated with LMR have been overcome, as the talk group control function provided by the embodiments avoids time-delays, user distraction from current tasks and further avoids scrolling through radio display screens. Postponed or missed communications have been minimized as receive signals are able to reach the radio user faster.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio, comprising:
   a voice control button enabling a voice control feature to the portable radio;
   a controller, comprising:
      a code plug preconfigured with a plurality of channel alias names and zone alias names;
      an automatic speech recognition (ASR) engine providing detection of a voice control entry to the portable radio;
   the controller enabling a talk group change in response to the ASR detecting that the voice control entry is a talk group control command comprising a channel command word followed by a channel alias name; and
   the portable radio generating an audible feedback associated with the talk group change, the audible feedback comprising an audible confirmation configured to:
      audibly repeat the channel alias name in response to changing to that channel within a current zone, without announcing the current zone; and
      audibly repeat the channel alias name and announce a zone alias name, when the channel alias name is in a different zone.

2. The portable radio of claim 1, wherein the plurality of channel alias names and zone alias names are configured by an agency.

3. The portable radio of claim 1, wherein the portable radio is a public safety Land Mobile Radio (LMR).

4. The portable radio of claim 1, wherein the portable radio is responsive to a single talk group control command to effect talk group change, without query from the portable radio.

5. The portable radio of claim 1, wherein the code plug is further configured to:
   mute received LMR audio signals during a voice control button press; and
   block the voice control feature when LMR audio signals are received at the portable radio.

6. The portable radio of claim 1, wherein the audible feedback generated by the portable radio further comprises:
   an audible notification that the talk group change was not taken, when the talk group change was not available.

7. The portable radio of claim 1, wherein the audible confirmation of the talk group change being taken comprises a truncated portion of the talk group control command.

8. The portable radio of claim 1, wherein receive LMR signals received at the portable radio are mixed with the audible confirmation of the talk group change being taken.

9. The portable radio of claim 1, wherein the audible feedback is further configured to:
   audibly repeat both zone and channel alias names in response to the voice control entry comprising both zone and channel alias names, when the zone and channel are available.

10. The portable radio of claim 1, further comprising:
    a push-to-talk (PTT) dedicated to half-duplex voice communication; and
    wherein the ASR engine provides detection of the voice control entry to the portable radio, without pressing of the PTT button.

11. The portable radio of claim 10, wherein the voice control button enables the voice control feature to manage talk group change during land mobile radio (LMR) operation of the portable radio.

12. A method to manage voice control in a portable radio, comprising:
    pre-programming a portable radio code plug with a plurality of talk group control aliases including channel alias names and zone alias names;
    detecting a voice control entry at the portable radio;
    determining, by an automatic speech recognition (ASR) engine of the portable radio, that the voice control entry is a talk group control command, the talk group control command comprising a command word followed by a channel alias name of the plurality of talk group control aliases;
    performing a talk group change in response to the talk group control command; and
    generating an audible feedback associated with the talk group change, the audible feedback comprising an audible confirmation when the talk group change is available, by:
       audibly repeating the channel alias name in response to changing to that channel within a current zone, without announcing the current zone; and
       audibly repeating the channel alias name and announcing a zone alias name, when an entered channel command is in a different zone.

13. The method of claim 12, wherein detecting voice control entry further comprises:
    pressing and holding a voice control button of the portable radio, generating a tone by the portable radio, and then speaking the talk group control command into the portable radio.

14. The method of claim 12, the talk group change is performed without query from the portable radio and without menu scrolling.

15. T The method of claim 12, the talk group change is performed without query from the portable radio and without menu scrolling.

16. The method of claim 12, wherein generating an audible feedback further comprises:
    generating an audible notification that the talk group change is unavailable, when the talk group change is unavailable.

17. The method of claim 12, wherein generating the audible confirmation of the talk group change further comprises:
    generating a truncated portion of the voice control entry to confirm the talk group change.

18. The method of claim 12, further comprising:
    mixing received land mobile radio (LMR) signals while generating the audible confirmation.

19. The method of claim 12, wherein generating the audible confirmation further comprises audibly repeating both the channel alias name and zone alias name in response to the voice control entry comprising both the channel alias name and a zone alias name, when both channel and zone are available.

20. A portable radio, comprising:
    a user interface and controller configured to:
       change talk groups in response to a verbal entry of a channel alias name; and
       generate an audible confirmation repeating the channel alias name without a zone alias name when the talk group change remains on a current zone;
    the user interface and controller are further configured to:
       change talk groups in response to a verbal entry of a channel alias name and a zone alias name;

generate an audible confirmation repeating the channel alias name only, without the zone alias name, when the talk group change remains on a current zone; and generate an audible confirmation repeating the channel alias name and the zone alias name, when the talk group changes to a different zone.

\* \* \* \* \*